United States Patent
Sekihara

(10) Patent No.: US 6,264,287 B1
(45) Date of Patent: Jul. 24, 2001

(54) HYDRAULIC BRAKE APPARATUS FOR A VEHICLE

(75) Inventor: Yasuhito Sekihara, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/296,566

(22) Filed: Apr. 22, 1999

(30) Foreign Application Priority Data

Apr. 22, 1998 (JP) .................................................. 10-111603

(51) Int. Cl.⁷ .............................. B60T 13/16; B60T 8/36; B60T 8/40
(52) U.S. Cl. ...................... 303/10; 303/119.2; 303/116.1
(58) Field of Search ............................. 303/116.1, 116.2, 303/119.2, 119.1, 10, 11

(56) References Cited

U.S. PATENT DOCUMENTS

| | | | |
|---|---|---|---|
| 5,169,214 | * 12/1992 | Holzmann et al. | 303/116.1 |
| 5,188,437 | * 2/1993 | Wilmann | 303/116.2 |
| 5,236,256 | * 8/1993 | Schmidt et al. | 303/116.2 |
| 5,275,476 | * 1/1994 | Maisch | 303/116.1 |
| 5,348,381 | * 9/1994 | Bernhardt et al. | 303/116.1 |
| 5,356,210 | 10/1994 | Maas . | |
| 5,586,814 | * 12/1996 | Steiner | 303/116.2 |
| 5,636,907 | * 6/1997 | Okazaki et al. | 303/116.1 |
| 5,673,979 | * 10/1997 | Kuromitsu et al. | 303/116.1 |
| 5,967,627 | * 10/1999 | Hosoya et al. | 303/119.2 |
| 5,971,501 | * 10/1999 | Hosya | 303/119.2 |
| 5,984,430 | * 11/1999 | Koga et al. | 303/116.1 |
| 6,003,958 | 12/1999 | Volz et al. . | |

FOREIGN PATENT DOCUMENTS

| | | |
|---|---|---|
| 41 08 640 | 9/1992 | (DE) . |
| 44 22 738 | 1/1996 | (DE) . |
| 196 13 903 | 10/1997 | (DE) . |
| 8-230634 | 9/1996 | (JP) . |
| 97/37879 | 10/1997 | (WO) . |

* cited by examiner

Primary Examiner—Robert J. Oberleitner
Assistant Examiner—Robert A. Siconolfi
(74) Attorney, Agent, or Firm—Burns, Doane, Swecker & Mathis, LLP

(57) ABSTRACT

A hydraulic brake apparatus for a vehicle includes a first hydraulic passage for supplying pressurized brake fluid from a master cylinder to wheel brakes without passing through a hydraulic pump, a first opening and closing electromagnetic valve interposed in the first hydraulic passage for opening and closing the first hydraulic passage, a second hydraulic passage for supplying brake fluid from the master cylinder to the suction side of the hydraulic pump, and a second opening and closing electromagnetic valve interposed in the second hydraulic passage for opening and closing the second hydraulic passage. A passage cross sectional adjusting valve is interposed in the second hydraulic passage and decreases the passage cross sectional area of the second hydraulic passage to suppress the transmission of a hydraulic pulsation generated in a suction side of the hydraulic pump to the master cylinder when the brake pedal is depressed. The passage cross sectional adjusting valve increases the passage cross sectional area of the second hydraulic passage to decrease the resistance for suctioning by the hydraulic pump when the brake pedal is not depressed.

10 Claims, 4 Drawing Sheets

HYDRAULIC BRAKE APPARATUS FOR A VEHICLE

This application is based on and claims priority under 35 U.S.C. § 119 with respect to Japanese Application No. 10(1998)-111603 filed on Apr. 22, 1998, the entire content of which is incorporated herein by reference.

FIELD OF THE INVENTION

The present invention generally relates to a vehicle brake apparatus. More particularly, the present invention pertains to a hydraulic brake apparatus for a vehicle that has a hydraulic pump for generating brake pressure.

BACKGROUND OF THE INVENTION

A known type of hydraulic brake apparatus is disclosed in Japanese Patent Application Laid-Open Publication No. 8(1996)-230634. This apparatus includes wheel brakes for applying a braking force to road wheels of the vehicle in response to hydraulic pressure supplied to the wheel brakes, a reservoir for storing brake fluid, a master cylinder which pressurizes the brake fluid supplied from the reservoir in response to the operation of a brake pedal and supplies the pressurized brake fluid to the wheel brakes, and an electromotive hydraulic pump which pressurizes the brake fluid supplied from the reservoir through the master cylinder and discharges the brake fluid to the wheel brakes.

The apparatus further includes a first hydraulic passage for supplying pressurized brake fluid from the master cylinder to the wheel brakes without passing through the hydraulic pump, a second hydraulic passage for supplying brake fluid from the master cylinder to the suction side of the hydraulic pump, a first electromagnetic valve interposed in the first hydraulic passage for opening and closing the first hydraulic passage, and a second electromagnetic valve interposed in the second hydraulic passage for opening and closing the second hydraulic passage. A third hydraulic passage supplies the brake fluid discharged from the hydraulic pump to a portion of the first hydraulic passage between the first electromagnetic valve and the wheel brakes, and a third electromagnetic valve is interposed between the wheel brakes and a connecting portion between the first hydraulic passage and the third hydraulic passage. A fourth hydraulic passage discharges brake fluid from the wheel brakes to the suction side of the hydraulic pump, and a fourth electromagnetic valve is interposed in the fourth hydraulic passage.

In the normal operation of the apparatus, the second and fourth electromagnetic valves are closed and the first and third electromagnetic valves are open. Further, the operation of the hydraulic pump is stopped. Therefore, when the driver of the vehicle depresses the brake pedal, the master cylinder pressurizes the brake fluid supplied from the reservoir and supplies the pressurized brake fluid to the wheel brakes through the first and third electromagnetic valves. Accordingly, the hydraulic pressure in the wheel brakes is varied in response to variations in the depressing force of the brake pedal.

In situations requiring that the brake apparatus be operated to produce higher hydraulic pressure in the wheel brakes than the hydraulic pressure generated by the master-cylinder when the brake pedal is depressed, the first electromagnetic valve is closed and the second electromagnetic valve is opened. Further, the hydraulic pump is driven by an electric motor. The hydraulic pump thus further pressurizes the pressurized brake fluid supplied from the master cylinder through the second electromagnetic valve and discharges the brake fluid to the wheel brakes through the third electromagnetic valve.

Further, in situations requiring that the apparatus be operated to supply hydraulic pressure to the wheel brakes when the brake pedal is not depressed, the first and fourth electromagnetic valves are closed and the second and third electromagnetic valves are opened. Further, the hydraulic pump is driven by the electric motor. The hydraulic pump thus pressurizes the brake fluid supplied from the reservoir through the master cylinder and the second electromagnetic valve, and discharges the brake fluid to the wheel brakes through the third electromagnetic valve.

The third and fourth electromagnetic valves are used for decreasing, re-increasing or maintaining the wheel brake hydraulic pressure supplied from the master cylinder or the hydraulic pump.

In the above-described brake apparatus, during operation of the hydraulic pump, a pulsation of the hydraulic pressure is generated at the suction side of the hydraulic pump due to the operation of the hydraulic pump. In situations where the master cylinder does not generate hydraulic pressure due to the non-depression of the brake pedal, this pulsation does not increase until a level at which problems are caused. However, in situations where the master cylinder generates hydraulic pressure due to depression of the brake pedal, the pulsation of the hydraulic pressure increases because the generated hydraulic pressure of the master cylinder acts on the suction side of the hydraulic pump. As a result, brake pedal vibration is caused and this gives the driver an unpleasant feeling. Further, vibration of hydraulic conduits or piping constituting the hydraulic passages is caused and noise is generated by this vibration. It might be possible to reduce the vibration of the brake pedal and hydraulic conduits by decreasing the cross sectional area of the second hydraulic passage so that the transmission of the pulsation to the master cylinder is suppressed. However, this would also increase the resistance for auctioning of the hydraulic pump and so the amount of brake fluid discharged from the hydraulic pump would be decreased when the brake pedal is not depressed.

In light of the foregoing, it would be desirable to provide an improved hydraulic brake apparatus for a vehicle which is not as susceptible to the foregoing drawbacks and disadvantages.

A need thus exists for a vehicle hydraulic brake apparatus that is able to reduce or prevent vibration of the brake pedal and hydraulic conduit during operations when the brake pedal is depressed without also decreasing the amount of brake fluid discharged from the hydraulic pump during operations involving non-depression of the brake pedal.

SUMMARY OF THE INVENTION

According to the present invention, a vehicle hydraulic brake apparatus includes wheel brakes for applying a braking force to road wheels of the vehicle in response to hydraulic pressure supplied to the wheel brakes, a reservoir for storing brake fluid, a master cylinder for pressurizing the brake fluid supplied from the reservoir in response to the operation of a brake pedal and for supplying the pressurized brake fluid to the wheel brakes, and a hydraulic pump for pressurizing the brake fluid supplied from the reservoir through the master cylinder and for discharging the brake fluid to the wheel brakes. A first hydraulic passage is provided for supplying the pressurized brake fluid from the master cylinder to the wheel brakes without passing through the hydraulic pump, and a first valve is interposed in the first hydraulic passage for opening and closing the first hydraulic passage. A second hydraulic passage is provided for supplying brake fluid from the master cylinder to the suction side of the hydraulic pump and a second valve is interposed in the second hydraulic passage for opening and closing the second hydraulic passage. An adjusting device is located in the second hydraulic passage for adjusting the cross-sectional area of the second hydraulic passage.

BRIEF DESCRIPTION OF THE DRAWING FIGURES

Additional features and characteristics of the present invention will become more apparent from the following detailed description considered with reference to the accompanying drawing figures in which like elements are designated by like reference numerals and wherein.

DETAILED DESCRIPTION OF THE PREFERRED EMBODIMENTS

Figure 1:
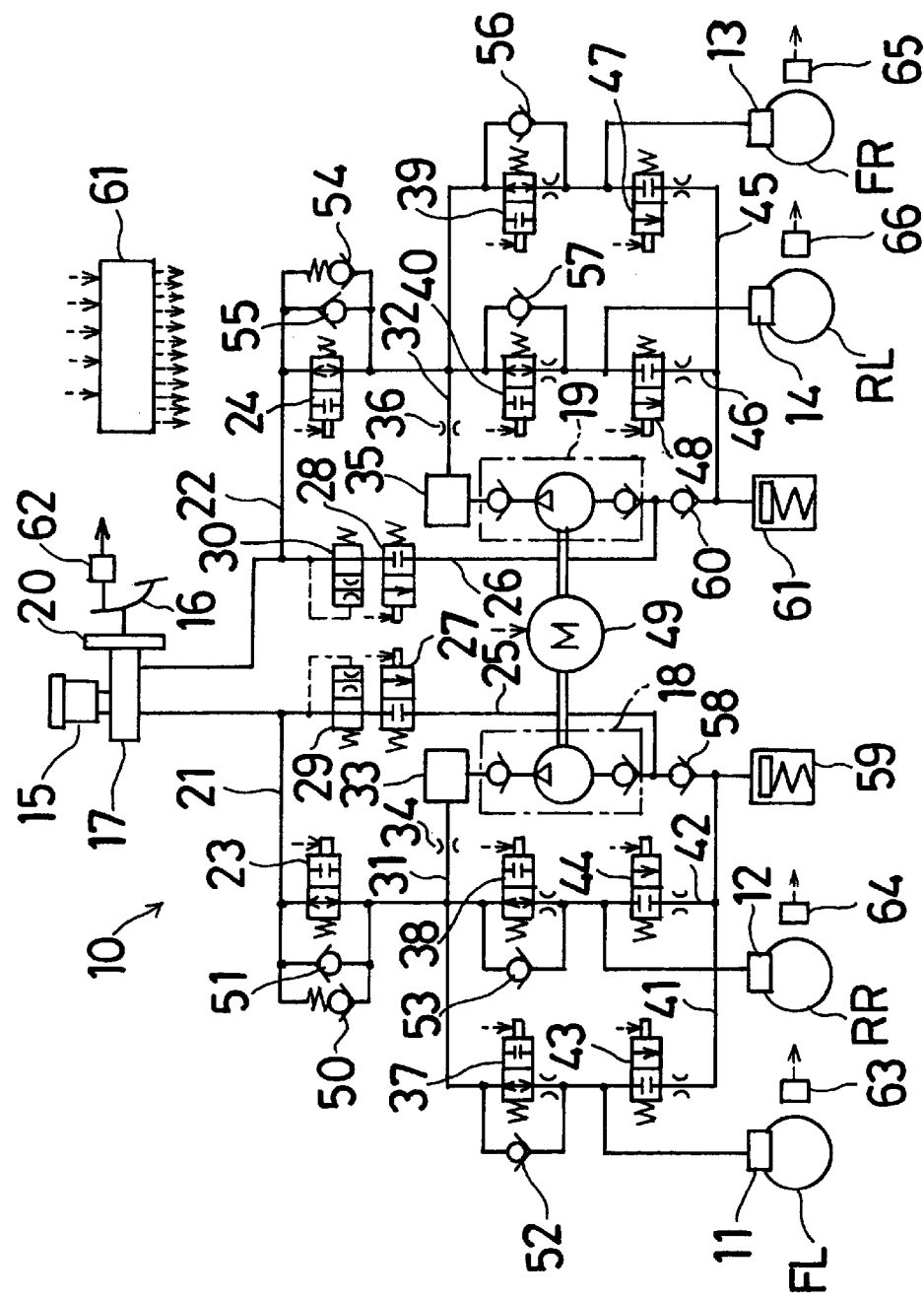
FIG. 1 is a circuit diagram of a first embodiment of a hydraulic brake system according to the present invention.

Referring initially to FIG. 1, a vehicle hydraulic brake apparatus or system 10 in accordance with a first embodiment of the present invention is illustrated as a dual circuit type system. The hydraulic brake apparatus 10 includes wheel brakes 11, 12, 13, 14 for applying respective braking forces to respective road wheels FL (front-left wheel), RR (rear-right wheel), FR (front-right wheel), and RL (rear-left wheel). The braking force applied to each wheel brake is based on the hydraulic pressure supplied to the wheel brake. In this illustrated embodiment, the road-wheels FL and FR are driven wheels while the road-wheels RR, RL are non-driven wheels.

The hydraulic brake system 10 also includes a tandem master cylinder 17 (hereinafter referred to as a master cylinder) which applies hydraulic pressures to the wheel brakes 11 12, 13, 14 when brake fluid from a reservoir 15 is pressurized by depressing a brake pedal 16, a hydraulic pump 18 which pressurizes brake fluid supplied from the reservoir 15 to both of the wheel brakes 11, 12 by way of the master cylinder 17, and a hydraulic pump 19 which pressurizes brake fluid supplied from the reservoir 15 to both of the wheel brakes 13, 14 by way of the master cylinder 17. The hydraulic pumps 18, 19 are preferably in the form of piston type pumps driven concurrently by a common electric motor 49. A booster or servo mechanism 17 is interposed between the brake pedal 16 and the master cylinder 17, The booster or servo mechanism 17 amplifies the depression force of the brake pedal 16 which is to be transmitted to the master cylinder 17.

A normally open 2-port/2-position opening and closing electromagnetic valve 23 is disposed in a passage 21 which supplies brake fluid under pressure to both the wheel brakes 11, 12 from the master cylinder 17 directly or bypassing the hydraulic pump 18. A normally open 2-port/2-position opening and closing electromagnetic valve 24 is disposed in a passage 22 which supplies brake fluid under pressure to both the wheel brakes 13, 14 from the master cylinder 17 directly or bypassing the hydraulic pump 19. The passages 21, 22 constitute first hydraulic passages and the electromagnetic valves 23, 24 constitute first valve devices.

A normally closed 2-port/2-position electromagnetic opening and closing valve 27 is provided in a passages 25 which supplies brake fluid from the master cylinder 17 to the suction side of the hydraulic pump 18. Similarly, a normally closed 2-port/2-position electromagnetic opening and closing valve 28 is provided in a passage 26 which supplies brake fluid from the master cylinder 17 to the suction side of the hydraulic pump 19. The passages 25, 26 constitute second hydraulic passages and the electromagnetic valves 27, 28 constitute second valve devices.

A passage cross-sectional area adjusting valve 29 is provided in the passage 25 at a position between the electromagnetic valve 27 and the master cylinder 17. Likewise, a passage cross-sectional area adjusting valve 30 is provided in the passage 26 at a position between the electromagnetic valve 28 and the master cylinder 17. The passage cross-sectional adjusting valves 29, 30 possess the same construction and so the following description is to be understood to apply to both of the passage cross-sectional adjusting valves 29, 30.

Figure 2:
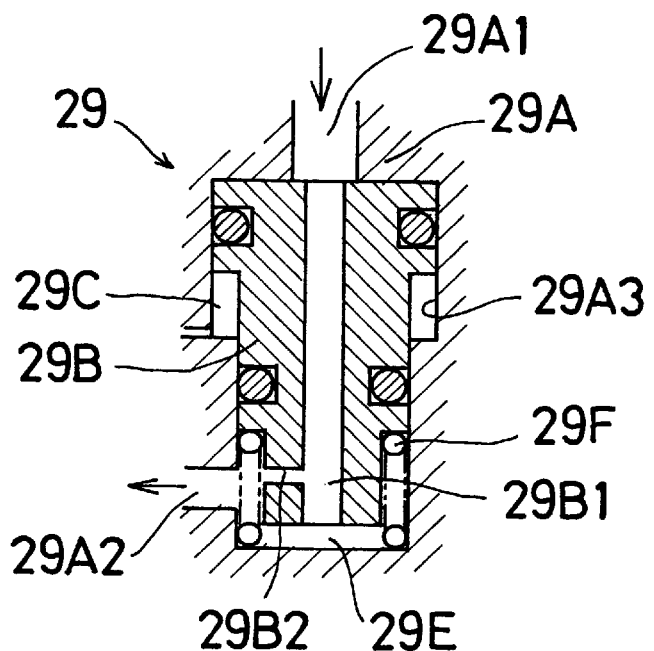
FIG. 2 is a cross-sectional view of a first embodiment of a passage area changeover valve used in the hydraulic brake system of the present invention, with the passage area changeover valve being in a first position.
Figure 3:
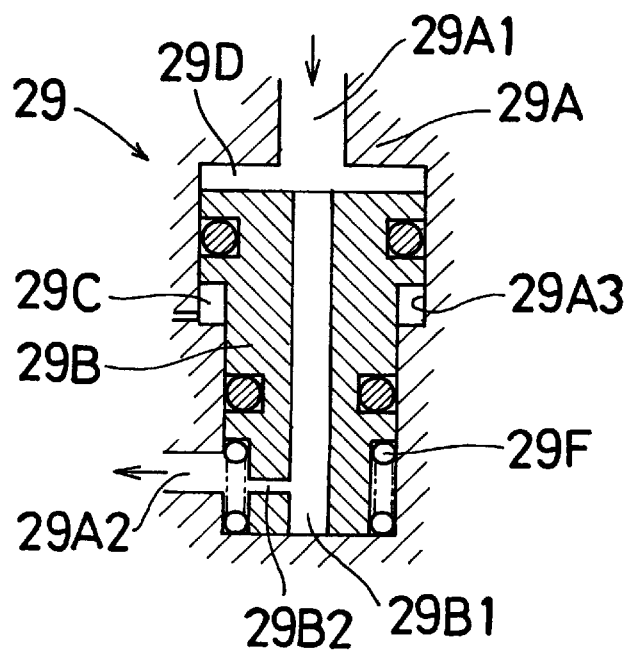
FIG. 3 is a cross-sectional view of the passage area changeover valve shown in FIG. 2 illustrated in the second position.

FIGS. 2 and 3 illustrate the structure and operation of the passage cross-sectional area adjusting valve 29. The valve 29 includes a body 29A provided with an upper side inlet port 29A1, a lower side outlet port 29A2, and a stepped cylinder 29A3. In the illustrated embodiment, the upper side inlet port 29A1 is located at the upper side of the body 29A and the lower side outlet port 29A2 is located adjacent the lower side of the body 29A. A stepped piston 29A is movably positioned in the stepped cylinder 29A3 in a fluid-tight manner. The stepped piston 29A possesses a larger diameter portion at its upper end, a smaller diameter portion at its bottom end and an intermediate diameter portion at a location between the larger diameter portion and the smaller diameter portion. An air chamber 29C opposing the lower end of the larger diameter portion of the piston 29B is defined within the stepped cylinder 29A3. Also defined within the stepped cylinder 29A3 is a fluid pressure chamber 29D communicating with the inlet port 29A1 and a fluid pressure chamber 29E communicating with the outlet port 29A2. The fluid pressure chamber 29D is located between the upper end of the piston 29B and the upper end of the cylinder 29A3 as seen in FIG. 3, and the fluid pressure chamber 29E is located between the lower end of the piston 29B and the lower end of the cylinder 29A3 as seen in FIG. 2. The inlet port 29A1 is in fluid communication with the master cylinder 17 and the outlet port 29A2 is in fluid communication with the suction side of the hydraulic pump 18.

The stepped piston 29B is formed with an axially extending through bore 29B1 and an orifice 29B2 positioned at the lower side of the piston 29B. In this embodiment, the orifice 29B2 is formed in the piston 29B at a location branching out from the bore 29B1 in region of the lower end of the bore 29B1. The orifice 29B2 extends radially outwardly from the bore 29B1 to communicate between the fluid chamber 29E and the neighborhood of the lower end of the bore 29B1. The diameter of the bore 29B1 is larger than the diameter of the orifice 29B2.

A spring 29F accommodated in the fluid chamber 29E continually urges the stepped piston 29B in the upward direction so that the piston 29B remains in the illustrated condition in FIG. 2 in which the lower end of the piston 29B is spaced from the bottom of the cylinder 29A3 so long as the fluid pressure at the inlet port 29A1 and the outlet port 29A2 is less than a set value (i.e. the brake pedal 16 is not being depressed). As soon as the fluid pressure at the inlet port 29A1 and the outlet port 29A2 exceeds the set value while the brake pedal 16 is being depressed, the stepped piston 29B is displaced in the downward direction against the urging force of the spring 29F due to the fact that the pressure receiving area corresponding to the cross-sectional area of the air chamber 29C receives the fluid pressure. Then, as shown in FIG. 3, the lower end of the piston 29B is brought into under-pressure engagement with the bottom of the cylinder 29A3 and the open lower end of the bore 29B1 is closed, resulting in an interruption of the fluid communication between the inlet port 29A1 and the outlet port 29A2 through the bore 29B1. In light of the fact that the bore 29B1 and the orifice 29B2 are included in the passage 25, the passage cross-sectional area of the passage 25 becomes larger and smaller while the conditions shown in FIG. 2 and FIG. 3 are being established, respectively.

That is, when the condition in FIG. 2 is established, the inlet port 29A1 communicates with the outlet port 29A2 through the bore 29B1 and the orifice 29B2, and so the passage cross-sectional area of the passage 25 is relatively larger. In contrast, when the condition in FIG. 3 is established, the inlet port 29A1 is communicated to the outlet port 29A2 only through the orifice 29B2 and so the passage cross-sectional area of the passage 25 is relatively smaller. The passage cross-sectional adjusting valves 29, 30 constitute adjusting devices.

Referring back to FIG. 1, the brake fluid discharged from the hydraulic pump 18 is fed via a passage 31 to a point between the electromagnetic valve 23 in the passage 21 and both of the wheel brakes 11, 12. A damper chamber 33 and an orifice 34 are positioned in series in the passage 31 to decrease the pulsation of the brake fluid discharged from the hydraulic pump 18. Similarly, the brake fluid discharged from the hydraulic pump 19 is fed via a passage 32 to a point between the electromagnetic valve 24 in the passage 22 and both of the wheel brakes 13, 14. A damper chamber 35 and an orifice 36 are positioned in series in the passage 32 to decrease the pulsation of the brake fluid discharged from the hydraulic pump 19. The passages 31, 32 constitute third hydraulic passages.

A normally open 2-port/2-position opening and closing electromagnetic valve 37 is interposed between the wheel brake 11 and the point at which the passage 21 is connected to the passage 31. Also, a normally open 2-port/2-position opening and closing electromagnetic valve 38 is interposed between the wheel brake 12 and the point at which the passage 21 is connected to the passage 31. Similarly, a normally open 2-port/2-position opening and closing electromagnetic valve 39 is interposed between the wheel brake 13 and the point at which the passage 22 connects to the passage 32. Also, a normally open 2-port/2-position electromagnetic valve 40 is interposed between the wheel brake 14 and the point at which the passage 22 connects to the passage 32.

A passage 41 extends between the wheel brake 11 and the suction side of the hydraulic pump 18 for allowing brake fluid flow from the wheel brake 11 to the suction side of the hydraulic pump 18. A passage 42 is also provided for allowing brake fluid flow from the wheel brake 12 to the passage 41. A normally closed 2-port/2-position electromagnetic valve 43 is disposed in the passage 41 and a normally closed 2-port/2-position electromagnetic valve 44 is disposed in the passage 42.

Similarly, a passage 45 is provided for allowing brake fluid flow from the wheel brake 13 to the suction side of the hydraulic pump 19 and another passage 46 is provided for allowing brake fluid flow from the wheel brake 14 to the passage 45. A normally closed 2-port/2-position opening and closing electromagnetic valve 47 is positioned in the passage 45 and a normally closed 2-port/2-position opening and closing electromagnetic valve 48 is positioned in the passage 46.

The valves 37, 38, 39, 40 constitute third valve devices, the passages 41, 42, 45, 46, constitute fourth hydraulic passage, and the valves 43, 44, 47, 48 constitute fourth valve devices.

A one-way valve 58 is disposed in the passage 41 for preventing brake fluid in the passage 25 from entering into the passage 41. The one-way valve 58 is connected to a lower pressure accumulator 59 which temporarily stores brake fluid from the wheel brakes 11, 12. Similarly, a one-way valve 60 is disposed in the passage 45 for preventing brake fluid in the passage 26 from entering the passage 45. The one-way valve 60 is connected to a lower pressure accumulator 61 which temporarily stores brake fluid from the wheel brakes 13, 14.

A differential pressure valve 50 and a one-way valve 51 are provided in the passage 21 in parallel to the electromagnetic valve 23, a one-way valve 52 is connected in parallel to the electromagnetic valve 37, and an one-way valve 53 is connected in parallel to the electromagnetic valve 38. The differential pressure valve 50 is adapted to prevent a predetermined increase of the fluid pressure at a lower stream side or a wheel brake side of the electromagnetic valve 23 relative to the fluid pressure at an upper side or a master cylinder side of the valve 23. The one-way valve 51 enables a downstream or downward supply flow of brake fluid by bypassing the valve 23 while the valve 23 is closed or being closed. The one-way valve 52 enables an upward or upstream drain flow of brake fluid by bypassing the valve 37 while the valve 37 is closed or being closed. The one-way valve 53 enables an upward or upstream drain flow of brake fluid by bypassing the valve 38 while the valve 38 is closed or being closed.

Similarly, a differential pressure valve 54 and a one-way valve 55 are provided in the passage 22 in parallel to the electromagnetic valve 24. Also disposed in passage 22 is a one-way valve 56 connected in parallel to the electromagnetic valve 39 and a one-way valve 57 connected in parallel to the electromagnetic valve 40. The differential pressure valve 54 is expected to prevent a predetermined increase of the fluid pressure at a lower or downstream side (wheel brake side) of the electromagnetic valve 24 relative to the fluid pressure at the upper side or upstream side (master cylinder side) of the valve 24. The one-way valve 55 enables a downward supply flow of the brake fluid by bypassing the valve 24 while the valve 24 is being closed. The one-way valve 56 enables an upward drain flow of the brake fluid by bypassing the valve 39 while the valve 39 is being closed. The one-way valve 57 enables an upward drain flow of the brake fluid by bypassing the valve 40 while the valve 40 is being closed.

The electromagnetic valves 23, 24, 27, 28, 37, 38, 39, 40, 43, 44, 47, 48, and the electric motor 49 are controlled by an electric controller 61 which may be in the form of a microprocessor. The controller 61 receives a detection signal from a sensor 62 which detects or determines a depression stroke of the brake pedal 16. The controller 61 also receives a detection signal from a sensor 63 which detects the rotational speed of the wheel FL, a detection signal from a sensor 64 which detects the rotational speed of the wheel RR, a detection signal from a sensor 65 which detects the rotational speed of the wheel FR, and a detection signal from a sensor 66 which detects the rotational speed of the wheel RL. The controller 61 establishes well-known anti-lock braking control, traction control, and urgent brake assist control on the basis of the inputted signals from the sensors 62, 63, 64, 65, 66. In normal brake operation, as indicated in FIG. 1, all of the valves 23, 24, 27, 28, 37, 38, 39, 40, 43, 44, 47, 48, and the electric motor 49 are inactive.

Under the illustrated condition in FIG. 1, when the brake pedal 16 is depressed for stopping a traveling vehicle, the booster 20 is driven to operate the master cylinder 17. Then, the brake fluid supplied from the reservoir 15 in the master cylinder 17 is pressurized and the resulting pressurized brake fluid is supplied to the wheel brakes 11, 12, 13, 14 via the passages 21, 21, 22, 22, respectively. As a result, braking forces based on the magnitude of the brake fluid pressures supplied to the respective wheel brakes 11, 12, 13, 14 are applied to the wheel brakes 11, 12, 13, 14. The pressure of the brake fluid applied to the wheel brakes 11, 12, 13, 14 corresponds to the magnitude of the inputted force to the master cylinder 17 or the outputted force from the booster 20.

While the vehicle is in a braking operation, the braking force applied to each of the road-wheels FL, RR, FR, RL may be relatively large compared to the frictional force between each road-wheel and the road surface. If at least one of the road-wheels, for example the road-wheel FL, is found to be in an excess slip tendency, or if a locking condition of the road-wheel FL appears, such a phenomena is detected by the controller 61. The valve 37, the valve 43, and the electric motor 49 are then turned on. Turning the valve 37 on interrupts the fluid supply from the master cylinder 17 to the wheel brake 11. Turning the valve 43 on discharges the pressurized brake fluid in the wheel brake 11 into the passage 41, which results in a decrease of the pressure of the brake fluid in the wheel brake 11 and this brings about a decrease of the braking force applied to the road-wheel FL to thereby decrease the detected slip or locking tendency of the road-wheel FL.

The brake fluid discharged into the passage 41 is returned to the passage 21 by the action of the hydraulic pump 18 which is driven by the electric motor 49. A differential amount of brake fluid representing the difference between the amount of brake fluid discharged into the passage 41 from the wheel brake 11 and the amount of brake fluid returned to the passage 21 by the hydraulic pump 18 is stored temporally in the lower pressure accumulator 59. This differential amount stored in the accumulator 59 is returned to the passage 21 by the hydraulic pump 18 when the incoming amount of brake fluid of the passage 41 is smaller than the returning amount of brake fluid to the passage 41. When no locking tendency and slip decreasing tendency are found in the road-wheel FL due to the decrease in the brake fluid in the wheel brake 11, the controller 61 begins to deactivate both of the valves 37, 43, or deactivates the valve 43 while repeatedly turning on and turning off the valve 37. Thus, the brake fluid under pressure supplied to the passage 21 from the master cylinder 17 and the hydraulic pump 18 is supplied continually or intermittently to the wheel brake 11, thereby increasing the fluid pressure in the wheel brake 11 in a linear mode or a step-by-step mode. This means that the braking force applied to the road-wheel FL increases, thereby increasing the slip rate of the road-wheel FL. Thus, depending on the slip rate of the road-wheel FL, an automatic adjustment of the fluid pressure in the wheel brake 11 is established, whereby the road-wheel FL can be applied with an as-high-as possible or maximum braking force which fails to bring about the locking condition of the road-wheel FL.

Similar automatic adjustment of the fluid pressure of each of the other wheel brakes 12, 13, 14 can be established by manipulating the electric motor 49 and each of the valves 38, 44, the valves 39, 47 and the valves 40, 48.

While the vehicle is undergoing a braking operation, the controller 61 watches whether or not the depression speed of the brake pedal 16 exceeds a threshold value. If the depression speed of the brake pedal 16 exceeds the threshold value, the controller 61 recognizes or understands that an urgent or emergency braking operation has been initiated and orders the valves 23, 24, 27, 28, and the electric motor 49 to operate. Then, the brake fluid under pressure issued from the master cylinder 17 is supplied to the suction side of the hydraulic pumps 18, 19 via the passages 25, 26, with the brake pressure discharged from the hydraulic pump 18 being supplied to the wheel brakes 11, 12 and the brake pressure discharged from the hydraulic pump 19 being supplied to the wheel brakes 13, 14. Even though the depression force applied to the brake pedal 16 may be small, the fluid pressure in the wheel brakes 11, 12 and the fluid pressure in the wheel brakes 13, 14 is increased by the hydraulic pumps 18, 19 until the anti-lock control is initiated. Under such an urgent braking assistant control mode, a relatively large pulsation of brake fluid occurs at the suction side of each of the hydraulic pumps 18, 19. The pulsation of the brake fluid which comes from the hydraulic pump 18 to the master cylinder 17 passes through the passage cross-sectional area adjusting valve 29, while the pulsation of the brake fluid which comes from the hydraulic pump 19 to the master cylinder 17 passes through the passage cross-sectional area adjusting valve 30. Under such a situation, the outputted brake pressure of the master cylinder 17 becomes larger than the set value and this causes each of the passage cross-sectional area adjusting valves 29, 30 to assume the position shown in FIG. 3. The illustrated condition of each of the valves 29, 30 reduces the cross-sectional area of each of the passages 25, 26. Thus, the transmission of the brake fluid pulsation can be restricted from the suction side of each of the hydraulic pumps 18, 19 to the master cylinder 17. This means that vibration of the brake pedal 16 of the master cylinder 17 and the piping of the related fluid circuits is reduced or restricted. The driver thus experiences a decrease in the uncomfortable feeling from the brake pedal 16. Further, noise generated at each piping is reduced. It is to be noted that even though the cross-sectional area of each of the passages 25, 26 is small, because the brake fluid under pressure from the master cylinder 17 is sucked or drawn in by the hydraulic pumps 18, 19, the discharging amount of the hydraulic pumps 18, 19 is ensured and the required amount of brake fluid to be supplied to the wheel brakes can be ensured.

In situations where, while the vehicle is traveling, either the driven road-wheel FL or the driven wheel FR, for example the road-wheel FL, is found to be in a tendency of slip rate increase indicating an idle rotation of the road-wheel FL, immediately upon detection of such phenomena the valves 23, 27 and the electric motor 49 are turned on by the controller 61. Thus, the brake fluid in the reservoir 15 is sucked into the hydraulic pump 18 via the passage 25 and the master cylinder 17, and the resultant pressurized brake fluid is discharged from the hydraulic pump 18 to the wheel brake 11 via the passage 21 to apply a braking force to the wheel brake 11, thereby decreasing the slip rate, of the road-wheel FL. When the slip rate of the road-wheel FL is reduced due to the increase of the braking pressure applied to the wheel brake 11, the controller 61 immediately upon detection of such a phenomena begins to manipulate the valves 37, 43 for decreasing the braking force in the wheel brake 11. Such an automatic adjustment of the braking force in the wheel brake 11 depending on the instant slip rate of the road-wheel FL enables the maximum driving force to be applied to the road-wheel FL which fails to bring an idle rotation of the road-wheel FL.

Regarding the road-wheel FR, depending on the instant slip rate of the road-wheel FR, the braking pressure in the wheel brake 13 can be maintained automatically by turning on the valves 24, 28 and the electric motor 49, and subsequently activating the valve 39 and inactivating the valve 47. It is thus possible to obtain the maximum driving force for the road-wheel FL which will not bring about an idle rotation of the road-wheel ER. Under such a traction control mode, no braking pressure is developed or generated by the master cylinder 17 due to the fact that the brake pedal is not being depressed. The condition of the passage cross-sectional area adjusting valves 29, 30 remain as illustrated in FIG. 2 under which the cross-sectional area of each of the passages 25, 26 is larger. This means that the sucking resistance of each of the hydraulic pumps 18, 19 is small and the discharging amount of the pumps can be ensured.

Figure 4:
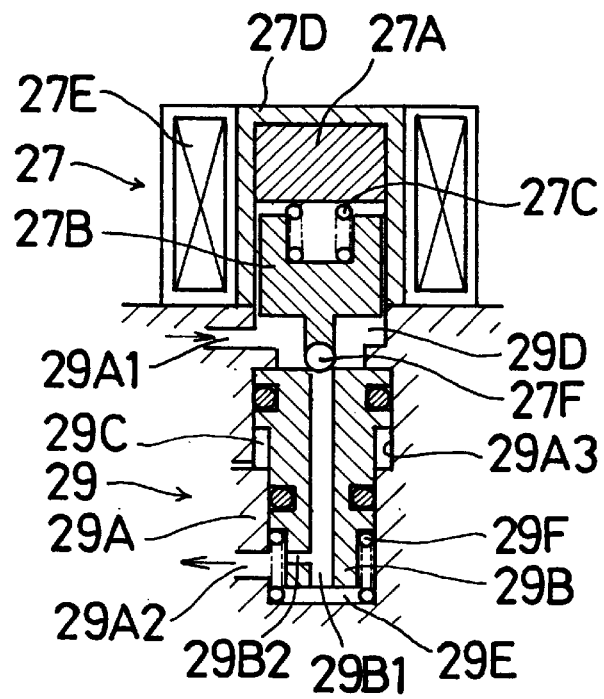
FIG. 4 is a cross-sectional view of an opening and closing valve in a non-excited state and a second embodiment of the passage area changeover valve in a first position.
Figure 5:
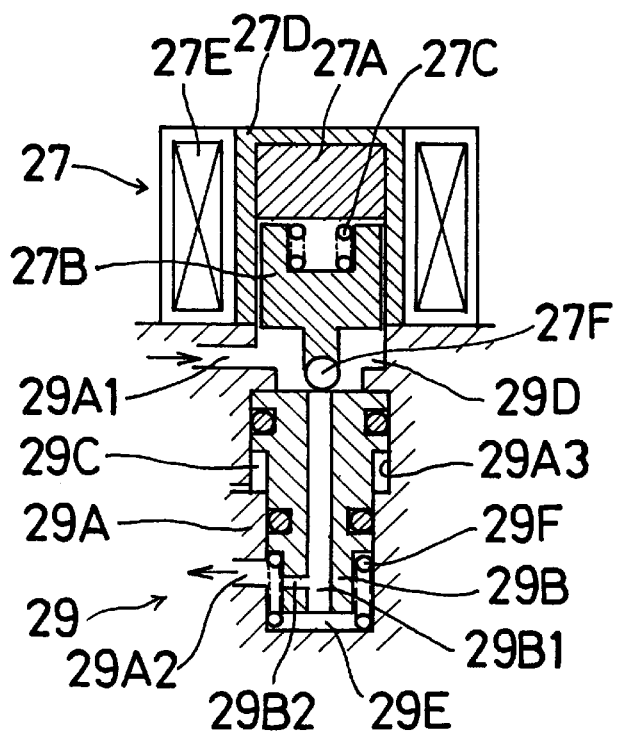
FIG. 5 is a cross-sectional view similar to FIG. 4, but illustrating the opening and closing valve in an excited state and the passage area changeover valve in the first position.
Figure 6:
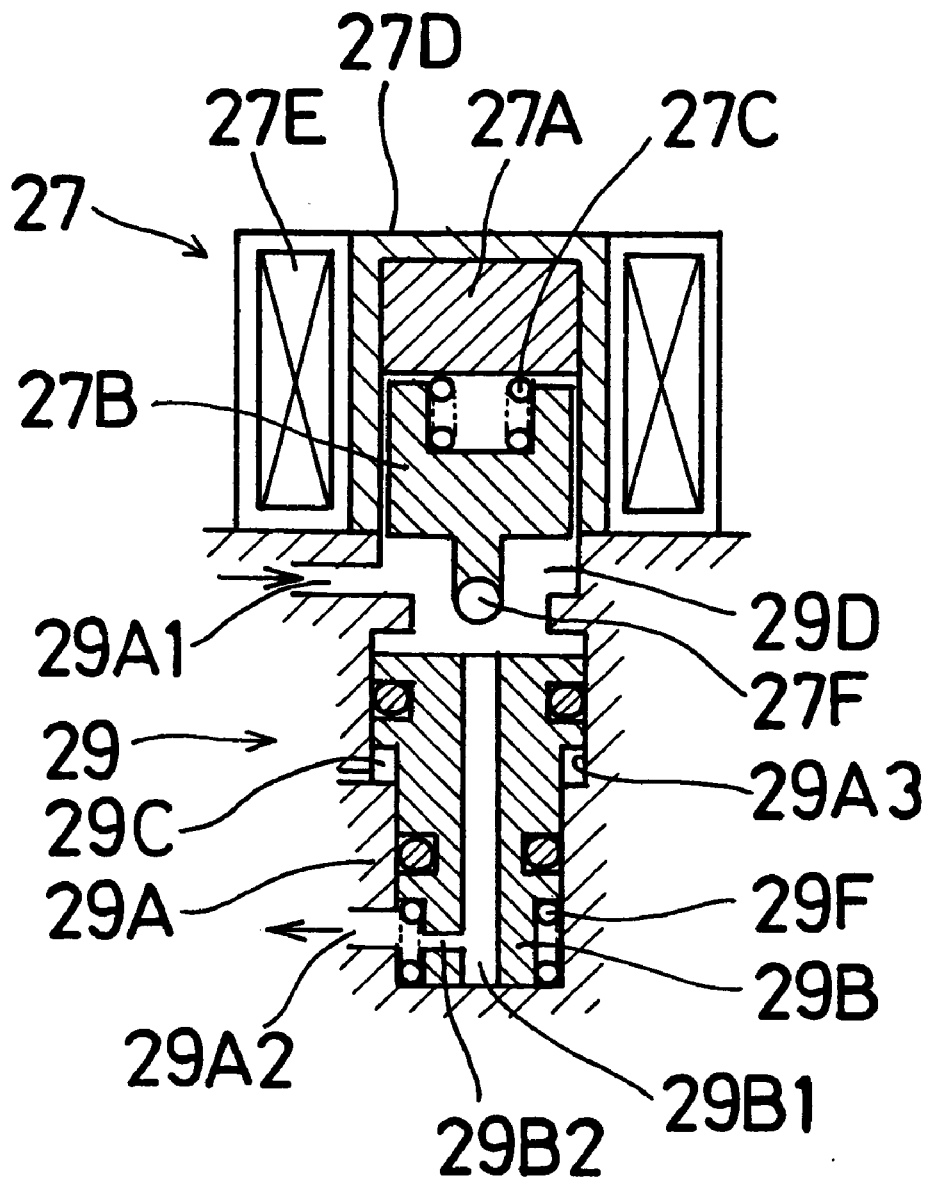
FIG. 6 is a cross-sectional view similar to FIG. 4, but illustrating the opening and closing valve in an excited state and the passage area changeover valve in a second position.

FIGS. 4–6 illustrate an embodiment of the present invention in which the valve 27 and the passage cross-sectional area adjusting valve 29 shown in FIG. 1 are integrated. As similar construction would also apply to integrating the valve 28 and the passage cross-sectional area adjusting valve 30.

The passage cross-sectional area adjusting valve 29 shown in FIGS. 4–6 includes a body 29A provided with an upper inlet port 29A1, a lower outlet port 29A2 and a stepped cylinder 29A3. A stepped piston 29B is positioned in the stepped cylinder 29A3 in a fluid-tight and movable manner to define an air chamber 29C opposing the lower end portion of the large diameter portion of the piston 29C. Also defined within the stepped cylinder 29A3 is a fluid pressure chamber 29D which is in fluid communication with the inlet port 29A1 and a fluid pressure chamber 29E which is in fluid communication with the outlet port 29E. The inlet port 29A1 is in fluid communication with the master cylinder 17 and the outlet port 29A2 is in fluid communication with the sucking side or drawing in side of the hydraulic pump 18. The stepped piston 29B is provided with an axially extending through bore 29B1 having a wider passage cross-sectional area and an orifice 29B2 having a narrower passage cross-sectional area. The orifice 29B2 is in fluid communication with the bore 29B1 near the lower end of the bore 29B1. The bore 29B1 and the orifice 29B2 constitute a part of the passage 25. A spring 29F is accommodated in the fluid chamber 29E and continually urges the stepped piston 29B in the upward direction. So long as the fluid pressure applied to the inlet port 29A1 is less than or equal to a set value, the piston 29B is held at its upper position as can be seen from FIG. 4. In this position, the lower end of the bore 29B1 is open toward the bottom of the cylinder 29A3.

As seen from FIGS. 4–6, an electromagnetic opening and closing valve 27 is placed above the passage cross-sectional area adjusting valve 29. The valve 27 includes a stationary iron core 27A, a movable iron core 27B, a spring 27C urging the movable core 27B in the downward direction, a stationary sleeve 27D in which is accommodated the members 27A, 27B, and 27C, and a solenoid coil 27E generating a magnetic attraction force which moves the movable core 27B in the upward direction against the urging force of the spring 27C. A valve member 27F is fixed to the lower end of the movable iron core 27B. The valve member 27F, which is illustrated as being a spherical element, opens and closes the opening at the upper end of the bore 29B1 of the piston 29B.

When the solenoid coil 27E is inactive, the movable iron core 27B with the valve member 27F are urged in the downward direction by the spring 27C, and so the valve member 27F closes the opening at the upper end of the bore 29B1 as shown in FIG. 4. The urging force of the spring 27C is set so as to keep the valve member 27F in the position which closes the bore 29B1 against the applied hydraulic pressure from the master cylinder. Accordingly, the passage 25 is closed.

When the solenoid coil 27 becomes active by applying an electric current to the solenoid coil 27, the movable iron core 27B and the valve member 27F are moved in the upward direction. The opening at the upper end of the bore 29B1 is thus opened as shown in FIGS. 5 and 6. Under the condition illustrated in FIG. 5, i.e. , fluid pressure supplied from the master cylinder to the outlet port 29A1 is less than the set value due to the fact that the brake pedal 16 is not depressed, the stepped piston 29B is held at its upward position by the spring 29E which allows fluid communication between the inlet port 29A1 and the outlet port 29A2 via the bore 29B1 and the orifice 29B21. As a result, the cross-sectional of the passage 25 remains large.

In contrast, under the condition illustrated in FIG. 6, the fluid pressure supplied from the master cylinder 17 to the inlet port 29A1 exceeds the set value due to depression of the brake pedal 16, the stepped piston 29B is moved in the downward direction against the urging force of the spring 29F due to the fluid pressure acting on an area equivalent to the cross-sectional area of the air chamber 29C, and the lower end of the stepped piston 29B is brought into engagement with the bottom of the cylinder 29A3 to thereby close the lower end of the bore 29B1. This means that the fluid communication between the inlet port 29A1 and the outlet port 29A2 can be established only by way of the orifice 29B2 and so the cross-sectional of the passage 25 becomes smaller.

Instead of the opening and closing electromagnetic valve 23 in FIG. 1, a linear electromagnetic valve can be interposed in the passage 21 which opens and closes the passage 21 at its inactive condition and which opens and closes the passage 21 at its active condition due to the application of an electric current so as to generate a difference in pressure (PM<PW) between the hydraulic pressure at the side of the master cylinder (PM) and the hydraulic pressure at the side of the wheel brakes (PW) in response to the applied electric current.

As mentioned above, according to the present invention, it is advantageously possible to prevent the brake pedal and the hydraulic conduit or piping from vibrating at a state in which the brake pedal is depressed without decreasing the amount of brake fluid discharged from the hydraulic pump at a state with the non-depression of the brake pedal.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A hydraulic brake apparatus for a vehicle comprising:
    wheel brakes for applying a braking force to road wheels of the vehicle in response to hydraulic pressure supplied to the wheel brakes;
    a reservoir for storing brake fluid;
    a master cylinder for pressurizing the brake fluid supplied from the reservoir in response to operation of a brake pedal and for discharging the pressurized brake fluid from the master cylinder;
    a hydraulic pump for pressurizing the brake fluid supplied from the reservoir through the master cylinder and for discharging the pressurized brake fluid from the hydraulic pump;
    a hydraulic passage for supplying the pressurized brake fluid from the master cylinder to a suction side of the hydraulic pump;
    a valve positioned in the hydraulic passage for opening and closing the hydraulic passage; and
    a passage area adjusting device disposed in the hydraulic passage, said passage area adjusting device including a cylinder in which is positioned a piston, said cylinder communicating with an outlet, said piston being provided with a first bore portion and a second bore portion having a smaller cross-sectional area than the first bore portion, said piston being normally urged towards a first position in which brake fluid flows to the outlet by way of the first bore portion and being movable to a second position by hydraulic pressure in the hydraulic passage in which brake fluid flows to the outlet by way of the second bore portion to suppress transmission of hydraulic pulsation generated in the suction side of the hydraulic pump to the master cylinder when the brake pedal is depressed.

2. A hydraulic brake apparatus for a vehicle as recited in claim 1, including another hydraulic passage for supplying the pressurized brake fluid from the master cylinder to the wheel brakes without passing through the hydraulic pump.

3. A hydraulic brake apparatus for a vehicle as recited in claim 2, including a valve disposed in said another hydraulic passage for opening and closing said another hydraulic passage.

4. A hydraulic brake apparatus for a vehicle as recited in claim 3, wherein said another hydraulic passage is a first hydraulic passage and said hydraulic passage for supplying the pressurized brake fluid from the master cylinder to a suction side of the hydraulic pump is a second hydraulic passage, said valve disposed in said first passage being a first valve and said valve disposed in said second hydraulic passage being a second valve, and including a third hydraulic passage for supplying the brake fluid discharged from the hydraulic pump to a portion of the first hydraulic passage downstream of the first valve.

5. A hydraulic brake apparatus for a vehicle as recited in claim 4, including a third valve disposed downstream of a connecting portion between the first hydraulic passage and the third hydraulic passage for opening and closing the first hydraulic passage.

6. A hydraulic brake apparatus for a vehicle as recited in claim 1, including a spring in the cylinder that urges the piston to the first position.

7. A hydraulic brake apparatus for a vehicle as recited in claim 1, wherein said passage area adjusting device is located between the master cylinder and said valve.

8. A hydraulic brake apparatus for a vehicle as recited in claim 1, wherein said valve is located between said passage area adjusting device and the suction side of the hydraulic pump.

9. A hydraulic brake apparatus for a vehicle as recited in claim 1, wherein said valve includes a movable core to which is fixed a valve member, a solenoid coil and means for urging the valve member on the movable core into engagement with the piston to prevent brake fluid flow to the first and second bore portions, and with energization of said solenoid coil causing said valve member on the movable core to move away from the piston.

10. A hydraulic brake apparatus for a vehicle as recited in claim 1, wherein the passage area in the hydraulic passage is changed to the second passage area irrespective of operation of the valve.

* * * * *